(12) United States Patent
Li et al.

(10) Patent No.: US 7,906,085 B2
(45) Date of Patent: Mar. 15, 2011

(54) FAST-REGENERABLE SULFUR DIOXIDE ADSORBENTS FOR DIESEL ENGINE EMISSION CONTROL

(75) Inventors: Liyu Li, Richland, WA (US); David L. King, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 344 days.

(21) Appl. No.: 11/731,116

(22) Filed: Mar. 30, 2007

(65) Prior Publication Data
US 2008/0241031 A1    Oct. 2, 2008

(51) Int. Cl.
*B01D 50/00*    (2006.01)
(52) U.S. Cl. ........................................ 423/177
(58) Field of Classification Search ............... 422/168, 422/177, 180; 60/286, 295, 297; 502/400
See application file for complete search history.

(56) References Cited

U.S. PATENT DOCUMENTS

| 4,725,417 | A | 2/1988 | Deschamps et al. |
|---|---|---|---|
| 5,248,321 | A | 9/1993 | Yang |
| 5,762,892 | A | 6/1998 | Kasahara et al. |
| 5,850,735 | A | 12/1998 | Araki et al. |
| 6,217,839 | B1 | 4/2001 | Hess et al. |
| 6,610,264 | B1 | 8/2003 | Buchanan et al. |
| 6,758,036 | B1 * | 7/2004 | Molinier ..................... 60/286 |
| 7,138,358 | B2 | 11/2006 | Huang et al. |
| 7,153,345 | B2 | 12/2006 | Li et al. |
| 7,160,342 | B2 | 1/2007 | Grieve et al. |
| 7,169,735 | B2 | 1/2007 | Sagae |
| 2005/0169826 | A1 | 8/2005 | Li et al. |
| 2006/0010859 | A1 * | 1/2006 | Yan et al. .................... 60/286 |
| 2006/0177367 | A1 | 8/2006 | Li et al. |
| 2007/0012028 | A1 * | 1/2007 | Weissman et al. .......... 60/275 |

OTHER PUBLICATIONS

Buelna et al., "Characteristics and desulfurization-regeneration properties of sol-gel-derived copper oxide on alumina sorbents," *Spearation and Purification Tehcnology*, vol. 39, pp. 167-179 (2004).
"Catalyst-Based Diesel Particulate Filters and $NO_x$ Adsorbers: A Summary of the Technologies and the Effects of Fuel Sulfur," Manufacturers of Emission Controls Association, 28 pp. (Aug. 14, 2000).
Corro, "Sulfur Impact on Diesel Emission Control—A Review," *React. Kinet. Catal. Lett.*, vol. 75, No. 1, pp. 89-106 (Jan. 2002).
"Heavy-Duty Engine and Vehicle Standards and Highway Diesel Fuel Sulfur Control Requirements," United States Environmental Protection Agency, Regulatory Announcement, 4 pp. (Dec. 2000).
Iretskaya et al., "Promoting Effect of Chloride on the $SO_2$ Adsorption Capacity and Adsorption Rate of Alumina-Supported Copper Oxide Adsorbents: Thermogravimetric and Infrared Studies," *J. Phys. Chem.*, vol. 107, pp. 4955-4962 (May 2003).

(Continued)

*Primary Examiner* — Tom Duong
(74) *Attorney, Agent, or Firm* — Klarquist Sparkman, LLP

(57) ABSTRACT

Disclosed herein are sorbents and devices for controlling sulfur oxides emissions as well as systems including such sorbents and devices. Also disclosed are methods for making and using the disclosed sorbents, devices and systems. In one embodiment the disclosed sorbents can be conveniently regenerated, such as under normal exhaust stream from a combustion engine, particularly a diesel engine. Accordingly, also disclosed are combustion vehicles equipped with sulfur dioxide emission control devices.

23 Claims, 14 Drawing Sheets
(12 of 14 Drawing Sheet(s) Filed in Color)

OTHER PUBLICATIONS

Li et al., "Cryptomelane as High-Capacity Sulfur Dioxide Absorbent for Diesel Emission Control: A Stability Study," *Ind. Eng. Chem. Res.*, vol. 44, No. 19, pp. 7388-7397 (Aug. 10, 2005). Li et al., "High-Capacity Sulfur Dioxide Absorbents for Diesel Emissions Control," *Ind. Eng. Chem. Res.*, vol. 44, pp. 168-177 (2005).

Li et al., "Method for Determining Performance of Sulfur Oxide Adsorbents for Diesel Emission Control Using Online Measurements of $SO_2$ and $SO_3$ in the Effluent," *Ind. Eng. Chem. Res.*, vol. 43, pp. 4452-4456 (Jun. 2004).

Li et al., "Synthesis and Characterization of Silver Hollandite and Its Application in Emission Control," *Chem. Mater.*, vol. 17, No. 17, pp. 4335-4343 (Jul. 2005).

Macken et al., "Reductive Regeneration of Sulfated $CuO/Al_2O_3$ Catalyst—Sorbents in Hydrogen, Methane, and Steam," *Ind. Eng. Chem. Res.*, vol. 37, pp. 2611-2617 (Jun. 1998).

Takahashi et al., "The new concept 3-way catalyst for automotive lean-burn engine: NO$x$ storage and reduction catalyst," *Catalysis Today*, vol. 27, pp. 63-69 (Jan. 1996).

\* cited by examiner

FAST-REGENERABLE SULFUR DIOXIDE ADSORBENTS FOR DIESEL ENGINE EMISSION CONTROL

This invention was made with Government support under Contract DE-AC06-76RLO1830 awarded by the U.S. Department of Energy. The Government has certain rights in the invention.

FIELD

This disclosure relates to emissions control, particularly the control of sulfur oxide emissions using regenerable sulfur dioxide sorbents.

BACKGROUND

The emission of pollutants such as sulfur oxides and nitrogen oxides in combustion waste gases causes serious environmental problems. Major efforts are underway to reduce these emissions through the implementation of particulate filters and $NO_x$ conversion devices. One promising approach to minimizing $NO_x$ emissions involves capturing and storing $NO_x$ as an alkali or alkaline earth nitrate during normal operation (lean conditions) and releasing the stored $NO_x$ after reducing it to molecular nitrogen ($N_2$) under fuel-rich conditions.

Sulfur oxides ($SO_x$) are produced as combustion byproducts and interfere with the function of current $NO_x$ traps by reacting with $NO_x$ catalytic components, degrading or "poisoning" the trap. Sulfur dioxide also reacts with the oxidants present in particulate filters, yielding sulfur trioxide, sulfuric acid particulates and depositing sulfate salts on the catalyst, which degrades the effectiveness of the particulate filter. Despite the recent introduction of low sulfur diesel fuels, the 15 ppmw (parts per million by weight) concentration of sulfur in these fuels still overwhelms current $NO_x$ traps and particulate filters.

Current sulfur absorbent technology has significant limitations. For example, copper-doped alumina ($Cu—Al_2O_3$) has been studied as a regenerable flue gas sulfur oxide absorbent. It reacts with $SO_2$ and $O_2$ at ~350° C. to form $CuSO_4$ and $Al_2(SO_4)_3$. The sulfated absorbent can be regenerated by reduction in $H_2$ or $CH_4$ at 400-500° C., followed by oxidation in air at 500° C. to reform the copper oxide phase. The chemistry involved in the absorption/regeneration cycle makes it extremely challenging to use Cu-doped $Al_2O_3$ as an on-line regenerable sulfur trap for diesel emission aftertreatment systems, due to the copper oxide/copper metal redox that is taking place in parallel with the sulfate adsorption and desorption. The unsulfated CuO will react with rich gas to form metallic Cu, which not only causes a fuel penalty, but also prevents the system from fast regeneration because copper oxide reduction competes kinetically with copper sulfate reduction. Thus, high loadings of copper do not provide an advantage in the preparation of the absorbent.

SUMMARY

Disclosed herein are sorbents and devices for controlling sulfur oxides emissions as well as systems including various embodiments and combinations of such sorbents and devices. Also disclosed are methods for using the disclosed sorbents, devices and systems in emissions control that overcome many of the limitations of current technologies for sulfur dioxide control. Also disclosed are methods for making and using the disclosed sorbents, devices and systems.

In one embodiment, emission control devices disclosed herein include sorbent beds or traps for absorbing sulfur dioxide. In one embodiment such devices include a sorbent material comprising first and second catalytic materials and a carrier. The first catalytic material is a precious metal, which typically is present in from about 0.1 weight percent to about 10 weight percent. Examples of suitable precious metals include, without limitation those such as platinum, palladium, ruthenium, rhodium and combinations thereof. The second catalytic material is silver, typically present in from about 1 weight percent to about 50 weight percent.

In further embodiments, a disclosed emission control device is included in a system for emissions control. In one example, such systems include first and second emission control devices fluidly connectable to a combustion exhaust stream source wherein the first emission control device comprises a sorbent material comprising from about 0.1 weight percent to about 10 weight percent platinum and from about 1 to about 50 weight percent silver and a carrier. Such systems may have the first emission control device arranged upstream of the second emission control device. In one embodiment the upstream, first emission control device comprises a sulfur dioxide trap.

One embodiment of the disclosed systems includes one or more regenerable sulfur dioxide traps, such as regenerable sulfur dioxide traps, including those that can be regenerated during a normal cycle of the combustion exhaust stream.

The carrier component of the disclosed sulfur dioxide sorbents may optionally be formed into or on a porous substrate. In such examples, the precious metal and/or silver constituents may be impregnated into or deposited on the carrier before or after deposition onto the porous substrate. Likewise, the precious metal and/or silver constituents may be mixed with the carrier, including intimately mixed with the carrier before the carrier is formed into a porous substrate.

Methods for using the disclosed sorbents may include a method for emissions control wherein a combustion exhaust stream is contacted with a sulfur dioxide sorbent including a precious metal and silver at a location upstream of a $NO_x$ trap. In one embodiment, this method results in more efficient operation of the $NO_x$ trap due to the removal of interfering sulfur compounds. In another aspect of a disclosed method the sorbent is regenerated by contacting it with a rich combustion waste stream, such as a combustion waste stream comprising less than about 1 molar percent oxygen.

Also disclosed herein are low emission motor vehicles, wherein the combustion engine that powers the vehicle is coupled to an emission control device containing a sorbent comprising both silver and a precious metal. This emission control device is further coupled to a downstream emission control device for removing $NO_x$ and/or particulates. The presently disclosed sorbents, emission control devices and systems can be used to reduce emissions from any waste stream source. In one aspect, the disclosed materials, devices and systems are particularly well-adapted for use with diesel combustion engines.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

I. Terms and Abbreviations

Figure 1:
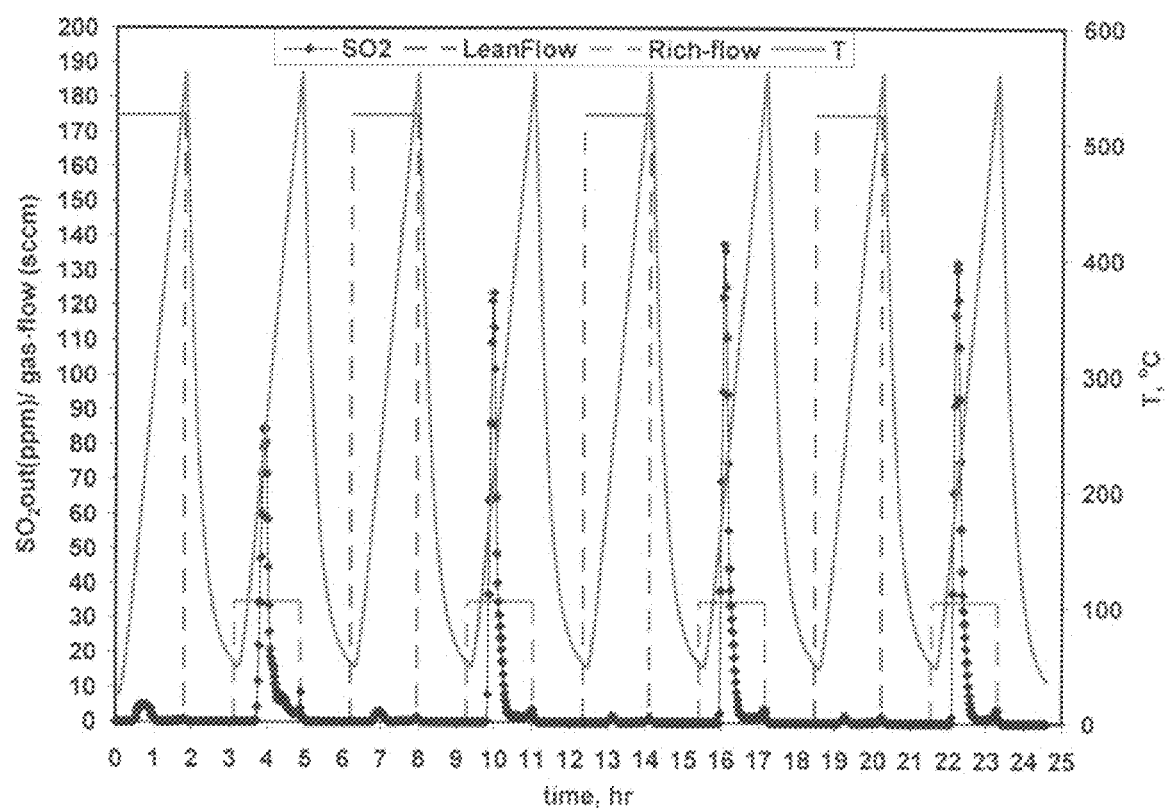
FIG. 1 is a graph of sulfur dioxide output versus time illustrating the sulfur dioxide absorption capability of a disclosed absorbent material as a combustion exhaust stream is repeatedly cycled from lean to rich.

The following explanations of terms and methods are provided to better describe the present sorbent compositions, devices systems and methods, and to guide those of ordinary skill in the art in the practice of the present disclosure. It is also to be understood that the terminology used in the disclosure is for the purpose of describing particular embodiments and examples only and is not intended to be limiting.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms and abbreviations which shall be understood to have the following meanings: "Optional" or "optionally" means that the subsequently described event or circumstance can but need not occur, and that the description includes instances where said event or circumstance occurs and instances where it does not.

"GHSV" refers to Gas Hourly Space Velocity.

"$SO_x$" refers to sulfur oxides, including sulfur dioxide and sulfur trioxide.

"$NO_x$" refers to nitrogen oxides, including nitric and nitrous oxides.

The term "sorb" refers to absorption and/or adsorption processes. Similarly the term "sorbent" refers to absorbents, adsorbents and combinations thereof.

II. Sorbent Materials, Systems and Methods for their Use

Disclosed herein are novel sorbents for removing sulfur dioxide from combustion exhaust. Also disclosed are systems comprising the sorbents as well as methods for their use.

One embodiment includes sulfur dioxide sorbent materials comprising first and second catalytic materials and an inorganic carrier. Typically the inorganic carrier is selected from one or more of alumina ($Al_2O_3$), silica ($SiO_2$), aluminosilicates, such as zeolites, titanium oxide ($TiO_2$), zirconium oxide ($ZrO_2$), magnesium oxide (MgO), divided carbides, for example silicon carbides (SiC). Mixed oxides or solid solutions comprising at least two of the above oxides also can be employed. In specific embodiments the inorganic carrier comprises fumed silica. To increase the dispersion of the materials and thus to increase their absorption capacity, the inorganic carrier can be formed into a porous support such as by extrusion or coating. The catalytic materials then may be deposited on or embedded in the porous support.

The sorbent materials can be in the form of a powder, beads, pellets or the like; they also optionally can be impregnated in or deposited on a substrate. For example, the sorbent materials also may be directly prepared on a monolithic substrate of an additional inorganic material, such as a ceramic or metal. Substrate materials, including monolithic substrates, that can be used include ceramics, such as those having the principal constituents alumina, titania, zirconia, cordierite, mullite, silica, aluminosilicates, a silicon carbide and/or nitride; an aluminum titanate; and/or a metal, generally obtained from iron, chromium or aluminum alloys optionally doped with, for example, nickel, cobalt, cerium or yttrium. Combinations of two or more of these materials also can be used.

For many embodiments, the surface area of the sorbent material is preferably maximized because a high specific surface area provides more efficient kinetics of adsorption and desorption. By way of example, in certain embodiments the sorbent material has a specific surface area in the range of from about 1 to about 300 $m^2/g$, such as from about 2 to about 300 $m^2/g$. In particular embodiments the sorbent material has a specific surface area of at least about 10 $m^2/g$, such as in the range of from about 30 to 250 $m^2/g$.

To enhance specific surface area, the structure of ceramic substrates can be that of a honeycomb or alternatively in the form of a foam or fiber. Similarly, metal substrates can be produced by winding corrugated strips or by stacking corrugated sheets to constitute a honeycomb structure with straight or zigzag channels which may or may not communicate with each other. Substrates also can be produced from metal fibers or wires which optionally are interlocked, woven or braided.

With aluminum or aluminum alloy substrates, it is recommended that they are pre-treated at high temperature (for example between about 700° C. and 1100° C.) to develop a microlayer of refractory alumina on the surface. Such a refractory microlayer typically has a porosity and specific surface area greater than that of the original metal, which encourages adhesion of sorbent materials and protects the remainder of the support against corrosion.

The quantity of sorbent phase, which includes first and second catalytic materials and the carrier, that may be deposited or prepared directly on a ceramic or metallic support (or substrate) is generally in the range of from about 20 grams of sorbent phase per liter of support to about 300 grams per liter, such as from about 50 grams to about 200 grams per liter of support.

For many uses, such as in connection with a combustion vehicle exhaust, it typically is preferable to use rigid supports (monoliths) with a large open porosity, such as more than 70%, to limit pressure drops that may cause high gas flow rates, and in particular high exhaust gas space velocities. These pressure drops are deleterious to proper functioning of the engine and can reduce the efficiency of internal combustion engines (gasoline or diesel). Further, the exhaust system is subjected to vibrations and to substantial mechanical and thermal shocks, typically monolithic sorbents are more robust under these conditions than those in the form of beads, pellets or extrudates, which run the risk of deterioration due to wear or fracturing.

In principle any technique for sorbent preparation can be used to prepare the presently disclosed sorbent materials as is known to those of skill in the art can readily ascertain. Particularly suitable methods include, without limitation, impregnation, such as impregnation by soaking, dry or pore volume impregnation and incipient wetness impregnation.

The first catalytic component of the sorbent material comprises a precious metal. The precious metal typically is selected from platinum, palladium, rhodium, ruthenium and combinations thereof. The preferred precious metals are platinum, palladium and rhodium, with the most preferred being platinum.

Figure 10:
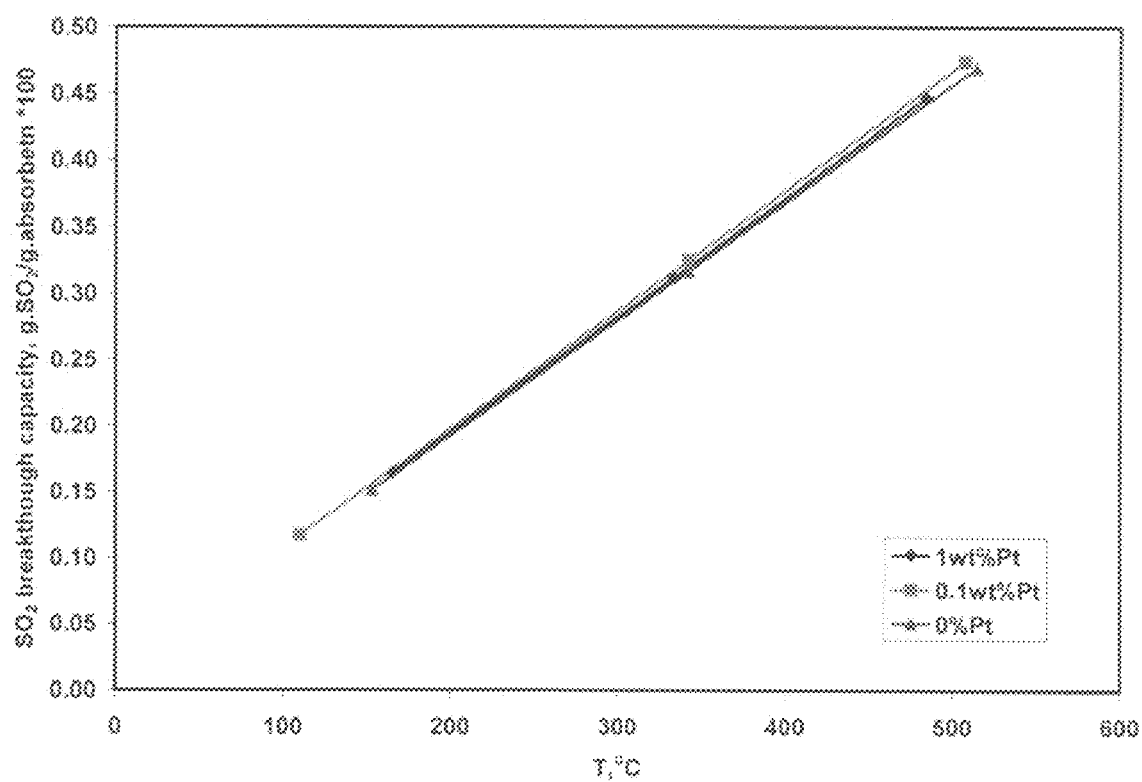
FIG. 10 illustrates the sulfur dioxide breakthrough capacity of absorbents having different platinum concentrations at different temperatures.
Figure 11:
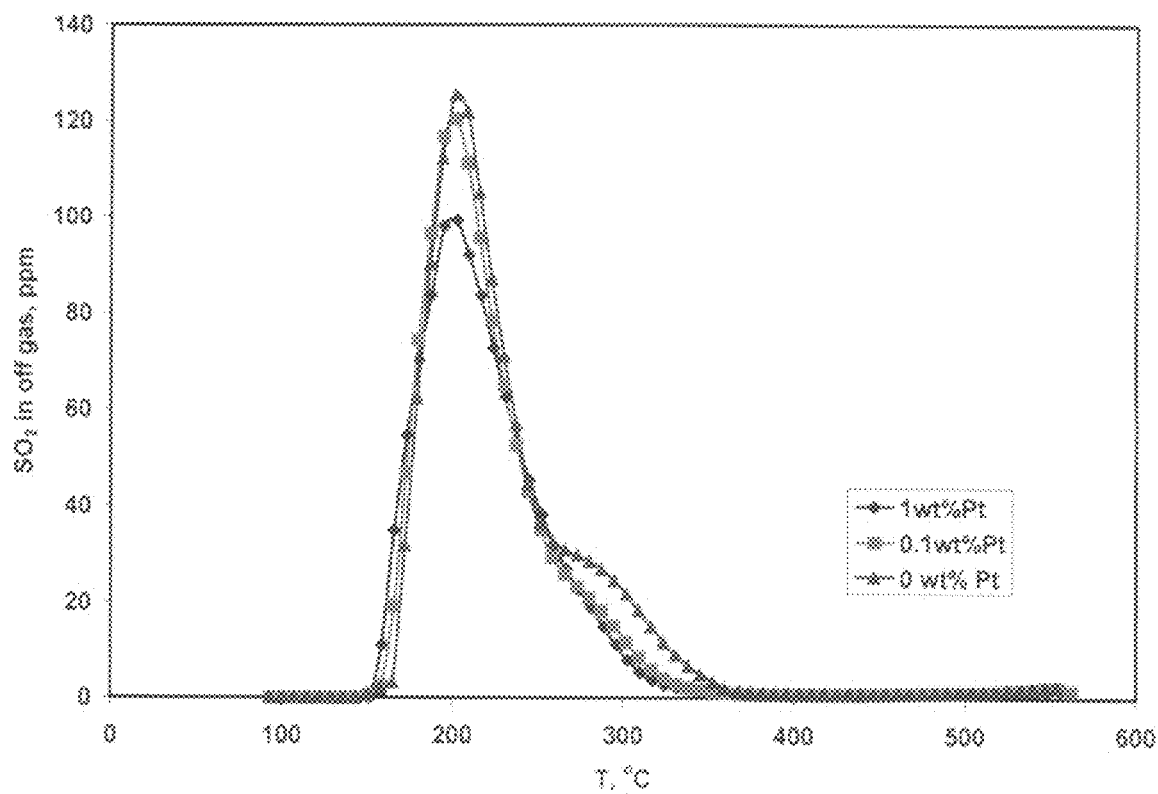
FIG. 11 illustrates the effect of different absorbent platinum concentrations on sulfur dioxide desorption at different temperatures.

With reference to FIGS. 10 and 11, and without limitation to theory, it currently is believed that the first catalytic component, the precious metal employed may or may not enhance sorption of sulfur dioxide, but facilitates regeneration of the sorbent.

The precious metal source can be in any form compatible with the methods employed to prepare the sorbent material. In general, when the first catalytic material includes platinum, it can be supplied as any platinum salt, preferably a water-soluble platinum salt. Typically, a platinum (II) source is employed, but platinum (IV) sources can be used as well. Particular examples of suitable platinum precursors for the preparation of the disclosed sorbents include, without limitation, $Pt(NH_3)_4(NO_3)_2$, $Pt(NO_3)_4$, $H_2PtCl_2$, $PtBr_2$ and combinations thereof. Working embodiments typically used $Pt(NH_3)_4(NO_3)_2$ as the platinum source.

The second catalytic component, silver, typically is present in from about a 1:10 to about a 500:1 ratio with the precious metal component, such as in a ratio of from about 1:1 to about 50:1, such as from about 1:5 to about 20:1. For example certain sorbents have a silver to precious metal ratio of about 2:1, 3:1, 5:1 or about 10:1. As with the precious metal, the silver can be provided in any form compatible with the methods used to prepare the sorbent material, as is known to those of ordinary skill in the art. In principle, silver (I) and/or silver (II) compounds can be used, but typically silver (I) compounds are used. Examples of suitable silver compounds include, without limitation, $Ag(OAc)$, $AgNO_3$, $Ag_2CO_3$ and combinations thereof. In working embodiments, $AgNO_3$ was used as the silver source.

The first catalytic material employed in the disclosed sorbents typically is present in from about 0.1 to about 10 weight percent. Weight percentages as referred to herein refer to the weight percent of the catalytic material relative to the weight of the entire sorbent material, including the catalytic material and any carrier material, if present. In particular embodiments, the disclosed sorbents may include from about 0.5 to about 5 weight percent of a first catalytic material, such as platinum. In other embodiments, disclosed sorbents include from about 0.2 to about 2 weight percent platinum, palladium, ruthenium, rhodium or a combination thereof. The second catalytic material, silver, typically is present in from about 1 to about 50 weight percent, such as from 1 to about 7.5 weight percent or from about 2 to about 15 weight percent, such as from about 2 to about 10 weight percent. More typically, the disclosed sorbent materials included less than about 7.5 weight percent silver, such as from about 1 to about 5 weight percent silver. Thus, embodiments of the disclosed sorbent materials include from about 0.2 to about 2 weight percent platinum and/or palladium and from about 1 to about 50 weight percent silver, such as from about 1 to about 10 weight percent or from 2 to about 7.5 weight percent silver.

The materials of the invention can adsorb oxides of sulfur present in the gases, in particular exhaust gases. These materials are capable of adsorbing SOx at a temperature which is generally in the range of from about 50° C. to about 650° C., preferably from about 100° C. to about 600° C., more typically from about 150° C. to about 550° C.

For diesel engines the temperature of the exhaust gas typically is from about 150° C. to 500° C. and rarely exceeds 600° C. Advantageously, the presently disclosed sorbents can be regenerated by desorption at the typical operating temperatures of combustion engines, including diesel engines, so that it is not necessary to control the temperature of the sorbent during the absorption and desorption phases. As referred to herein, regenerating a sorbent means removing a sorbed material such that the sorbent capacity of the sorbent material is increased or renewed. Specifically, the disclosed sorbents can be regenerated at a temperature of from about 50° C. to about 650° C., such as at from about 150° C. to about 550° C., including at from about 200° C. to about 500° C., such as from about 250° C. to about 500° C., and typically at from about 300° C. to about 450° C.

The materials used in the disclosed processes are thus suitable for sorbing oxides of sulfur present in the exhaust gases of stationary engines or, particularly, automotive diesel engines or spark ignition (lean burn) engines, but also in the gases from gas turbines operating with gas or liquid fuels. These exhaust gases typically contain oxides of sulfur in the range of a few tens to a few thousands of parts per million (ppm) and can contain comparable amounts of reducing compounds (CO, H2, hydrocarbons) and nitrogen oxides. These exhaust gases might also contain larger quantities of oxygen (1% to close to 20% by volume) and steam, though the present sorbents can be effective in oxygen-free environments as well. The sorbent material disclosed herein can be used with HSVs (hourly space velocity, corresponding to the ratio of the volume of the monolith to the gas flow rate) for the exhaust gas generally in the range of from about 500 to about 150,000 h−1, such as from about 5,000 to 100,000 h−1.

In one embodiment the currently disclosed sorbent materials are capable of absorbing a substantial amount of SOx, including sulfur dioxide from a combustion waste stream. As referred to herein a sorbent bed that sorbs a particular compound or material is referred to as a trap. For example a bed of the presently disclosed sorbent material that absorbs SOx may be referred to as an SOx trap. Certain examples of SOx traps prepared using the present sorbent materials are capable of absorbing 90% or more of the sulfur dioxide present in a waste stream, such as 95% or more of sulfur dioxide present in the stream. In one embodiment an SOx trap absorbs 97% or more of sulfur dioxide present in a waste stream.

The currently disclosed sorbent materials can be used in any application to absorb SOx. Nonetheless, embodiments of the presently disclosed sorbents are particularly well adapted for use in controlling emissions from combustion engines generally and diesel engines in particular. Examples of the presently disclosed materials overcome the limitations previously described absorbents used to control emissions from combustion engines. For example, one embodiment disclosed herein is a regenerable sulfur trap that absorbs SO2 during lean conditions and can be regenerated during the short rich conditions that also regenerate NOx traps. In addition, not only do the present materials absorb SOx, but placing an emissions device including these materials upstream of a NOx trap and/or particulate filter enhances the overall control of emissions from combustion engines.

In one embodiment, a disclosed SOx sorbent is regenerated under similar conditions as a NOx trap. For example, NOx traps can be regenerated under the reducing conditions of a rich exhaust stream. Likewise, in one embodiment the disclosed SOx sorbents undergo desorption and regeneration under rich conditions. Lean conditions are understood to be those under which there is more oxygen (O2) present than is required for complete combustion of fuel. Thus, there is substantially complete fuel oxidation with remaining oxygen. Conversely, rich conditions are understood to be those under which incomplete fuel oxidation occurs and the oxygen concentration is lower. Rich conditions typically are characterized by the presence of an organic material, elevated hydrogen levels, reduced oxygen levels, elevated carbon monoxide levels, elevated carbon dioxide levels, lower levels of nitrous oxide and/or lower levels of nitric oxide. In general the characteristics of rich exhaust compositions are known to those of skill in the art. Certain examples of rich exhaust streams include those wherein the oxygen concentration is 75% or less of the oxygen concentration in a conventional exhaust concentration and at least about 0.5% carbon monoxide, H2 and/or a hydrocarbon material. In certain such rich exhaust streams, the sum of the carbon monoxide, H2 and hydrocarbon concentrations is at least about 0.5% even though the concentration of one or more of these components is less than 0.5%. In one embodiment a rich exhaust stream is characterized by reduced oxygen concentrations, such as less than about 1 molar percent molecular oxygen. An exhaust stream can be considered rich with higher oxygen levels if, for example, the exhaust stream includes higher levels of carbon monoxide, hydrogen and/or organic material. For example, an exhaust stream including up to about 4% oxygen could be considered rich if the exhaust stream also included at least about 0.5%, such as 1% carbon monoxide, H2 and/or a hydrocarbon material. For example, such rich exhaust streams could include about 2%, and typically at least about 3% or one or more of one of these materials, such as carbon monoxide, such as at least about 5%. In still other examples a rich exhaust stream is substantially oxygen free. In certain embodiments a rich exhaust stream may be characterized in one aspect by elevated hydrocarbon concentrations, such as at least about 100 ppmw of a hydrocarbon or at least about 300 ppmw of a hydrocarbon. In one embodiment, a rich gas stream is characterized in one aspect by a hydrogen concentration of at least about 1%, such as at least about 2%. In certain embodiments a rich exhaust stream is characterized by elevated concentrations of carbon monoxide and/or carbon dioxide. For example, in one embodiment a rich exhaust stream includes at least about 1 molar percent carbon monoxide and/or at least about 10 molar percent carbon dioxide. Without being limited to a particular theory, it currently is believed that in certain disclosed sorbent systems, platinum sequesters excess oxygen in an exhaust stream such that a lean stream then becomes an effectively rich composition having an excess of organic material. Exemplary rich and lean exhaust compositions are described in Table 2.

In certain embodiments the rich gas stream for regenerating the sorbent material is provided by normal operation of a diesel engine. A rich gas stream suitable for regenerating the sorbent material also can be provided by a reformer that converts a fuel to hydrogen and carbon monoxide (the reformate). Three types of reformer technologies are typically employed (steam reformers, dry reformers, and partial oxidation reformers) to convert hydrocarbon fuel (methane, propane, natural gas, gasoline and the like) to hydrogen using water, carbon dioxide, and oxygen, with byproducts including carbon dioxide and carbon monoxide.

Steam reforming systems involve the use of a fuel and steam (H2O) that is reacted in heated tubes filled with catalysts to convert the hydrocarbons into principally hydrogen and carbon monoxide.

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of about 600° C. to about 1,200° C., and preferably, about 700° C. to about 1,050° C. The heat required to drive the reaction is typically supplied by burning a portion of the fuel. Catalysts also have been used with partial oxidation systems (catalytic partial oxidation) to promote conversion of various low sulfur fuels into synthesis gas. The use of a catalyst can accelerate the reforming reactions and can provide this effect at lower reaction temperatures than those that would otherwise be required in the absence of a catalyst. Typically the partial oxidation reforming reaction produces carbon monoxide and hydrogen from methane and oxygen.

Dry reforming involves the creation of hydrogen and carbon monoxide in the absence of water, for example using carbon dioxide. Examples dry reforming reactions convert methane and carbon dioxide to carbon monoxide and hydrogen.

III. EXAMPLES

General Methods and Materials

For most working examples silica was employed as a support for both the Pt oxidizing and reducing catalyst and the silver absorbent. The sorbents were prepared typically by incipient wetness impregnation, using aqueous solution mixtures of $Pt(NH_3)_4(NO_3)_2$ and $AgNO_3$ onto a fumed silica support, followed by drying and calcining at 500° C. in air. Exemplary sorbents prepared are listed in Table 1 along with their methods of preparations. Except for Cab-O-Sil fumed silica, which was obtained from Cabot Corporation, all other chemicals were purchased from Aldrich Chemical Company, Milwaukee, Wis. The sorbents were evaluated as 40-80 mesh or 80-200 mesh granules, formed by pressing finely ground powders into a tablet at 20,000 psi for 5 minutes followed by crushing and screening. Unless otherwise specified, typical measurements employed a 50 mg absorbent sample.

TABLE 1

Exemplary Sulfur Sorbent Materials

| ID | Absorbent composition | Description |
|---|---|---|
| 86D | 1 wt % Pt—5 wt % Ag—$SiO_2$ | $H_2PtCl_6$ as Pt source, $AgNO_3$ as Ag source, Cab-O-Sil fumed silica as $SiO_2$ source. First added $AgNO_3$ aqueous solution to $SiO_2$ (first incipient wetness impregnation), dried at 120° C. Subsequently added $H_2PtCl_6$ aqueous solution to $AgNO_3$—$SiO_2$ mixture (second incipient wetness impregnation), dried at 120° C. The material was calcined at 500° C. for 4 h. |
| 125A | 1 wt % Pt—10 wt % Ag—$SiO_2$ | Same as 86D |
| 125B | 2 wt % Pt—10 wt % Ag—$SiO_2$ | Same as 86D |
| 128 | 2 wt % Pt—5 wt % Ag—$SiO_2$ | $Pt(NH_3)_4(NO_3)_2$ as Pt source, $AgNO_3$ as Ag source, Cab-O-Sil fumed silica as $SiO_2$ source. Dissolved Pt and Ag sources in D.I. water. Then added the mixture to $SiO_2$ by incipient wetness impregnation. Dried at 120° C. and calcined at 500° C. 4 h. |
| 118 | 1 wt % Pt—5 wt % Ag—$SiO_2$ | Same as 128 |
| 120A | 0.5 wt % Pt—5 wt % Ag—$SiO_2$ | Same as 128. |
| 120B | 0.1 wt % Pt—5 wt % Ag—$SiO_2$ | Same as 128. |
| 146 | 0 wt % Pt—5 wt % Ag—$SiO_2$ | Same as 128, without Pt |
| 130A | 1 wt % Pt—2.5 wt % Ag—$SiO_2$ | Same as 128. |
| 130B | 1 wt % Pt—7.5 wt % Ag—$SiO_2$ | Same as 128. |
| 120C | 1 wt % Pt—3.2 wt % Ag—$SiO_2$ | $Pt(NH_3)_4(NO_3)_2$ as Pt source, 5 wt $AgNO_3$ on silica gel as Ag and $SiO_2$ sources. Added $H_2PtCl_6$ aqueous solution to $AgNO_3$—$SiO_2$ mixture (incipient wetness impregnation), dried at 120° C. Then the material was calcined at 500° C. for 4 h. |
| 116 | 1 wt % Pt—5 wt % Ag—$SiO_2$ | $Pt(NH_3)_4(NO_3)_2$ as Pt source, $AgNO_3$ as Ag source, 30 wt % silica sol in D.I. Water as $SiO_2$ source. Mixed desired amount of three sources, dried at 120° C. and calcined at 500° C. 4 h. |
| 83A | 1 wt % Pt—10 wt % Cu—$SiO_2$ | $H_2PtCl_6$ as Pt source, $Cu(NO_3)_2$ as Cu source, Cab-O-Sil fumed silica as $SiO_2$ source. First added $Cu(NO_3)_2$ aqueous solution to $SiO_2$ (first incipient wetness impregnation), dried at 120° C. Subsequently added $H_2PtCl_6$ aqueous solution to $Cu(NO_3)_2$—$SiO_2$ mixture (second incipient wetness impregnation), dried at 120° C. The material was calcined at 500° C. for 4 h |
| 83D | 1 wt % Pt—10 wt % Cu—$Al_2O_3$ | $H_2PtCl_6$ as Pt source, $Cu(NO_3)_2$ as Cu source, Catapal A $Al_2O_3$ as $Al_2O_3$ sources. Same precedure as that for sample 83A. |

Sulfation and desulfation evaluations and lean/rich cycling tests were carried out with an AMI-200R-HP unit (Altamira Instruments). The 200R-HP unit can automatically switch the feed to the heated reactor between lean and rich exhaust gas compositions at given time intervals. The compositions of the lean and rich exhaust simulants are given in Table 2. The gas compositions downstream of the absorbent were measured using a mass spectrometer (Dymaxion, Amertek). The sulfur concentrations were measured using a HP6890 gas chromatograph equipped with a Sulfur Chemiluminescent Detector (SCD), which has been described for example by Li and King, "Method for Determining Performance of Sulfur Oxide Adsorbents for Diesel Emission Control Using Online Measurements of $SO_2$ and $SO_3$ in the Effluent," *Ind. Eng. Chem. Res.* 2004, 43, 4452, which is incorporated herein by reference. During the test run the GC-SCD analytical system operated continuously, sampling the effluent once per minute. The minimum detection limit of the system to sulfur is approximately 50 ppb.

Unless otherwise specified, the simulated diesel engine exhaust stream had the composition set forth in Table 2. Other exhaust streams using different sulfur dioxide concentrations (for example streams having an $SO_2$ concentration of 25 ppm were used in certain examples) or additives, such as steam, are described below.

TABLE 2

Composition of simulated diesel engine exhausts used in the study

| Simulated Exhaust | CO | $CO_2$ | $C_3H_6$ | $H_2$ | $SO_2$ | $O_2$ | $NO_2$ | NO | $N_2$ |
|---|---|---|---|---|---|---|---|---|---|
| Lean | — | 5% | — | — | 5.15 ppm | 12% | 20 ppm | 180 ppm | Balance |
| Rich | 2% | 12.5% | 333 ppm | 2% | — | — | — | — | Balance |

With reference to Table 2, the recorded percentages are volume-based (molar) measurements. In certain examples, described below, the sorbent materials were evaluated using lean exhaust compositions having 25 ppm sulfur dioxide. Powder XRD diffraction measurements were conducted with a Philips PW3050 diffractometer using Cu Kα radiation and JADE, a commercial software package. Sample powders were mounted in a front-loading, shallow-cavity zero-background quartz holder, and the data were collected from 5° to 75° 2θ in step-scan mode using steps of 0.02°. Transmission electron microscopy (TEM) analysis was carried out on a Jeol JEM 2010F microscope. Selected area Energy Dispersive X-ray Spectroscopy (EDS) was performed on regions ofinterest using a Links EDS system equipped on the microscope. To obtain TEM images, the as-synthesized powder was dispersed in acetone solution, and then deposited on a Cu-carbon grid.

Example 1

Figure 2:
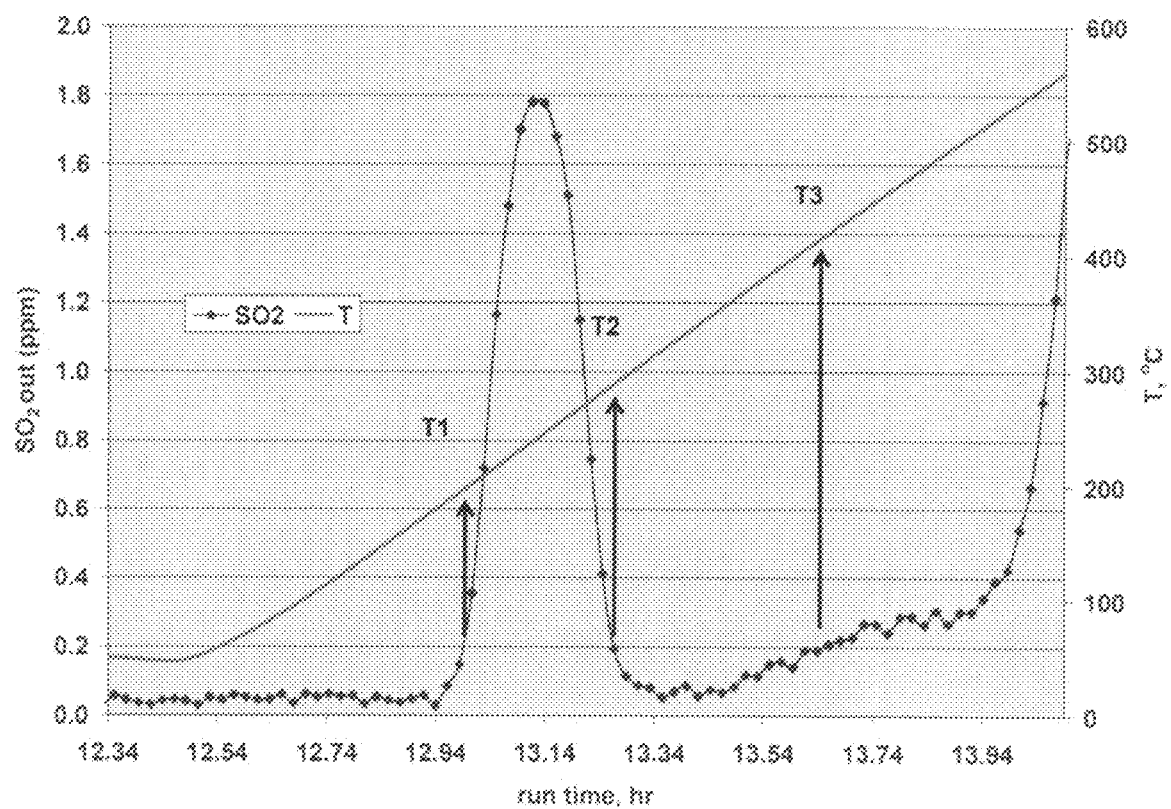
FIG. 2 illustrates the sulfur dioxide 200 ppb breakthrough capacities at three different temperatures, T1, T2, and T3.
Figure 3:
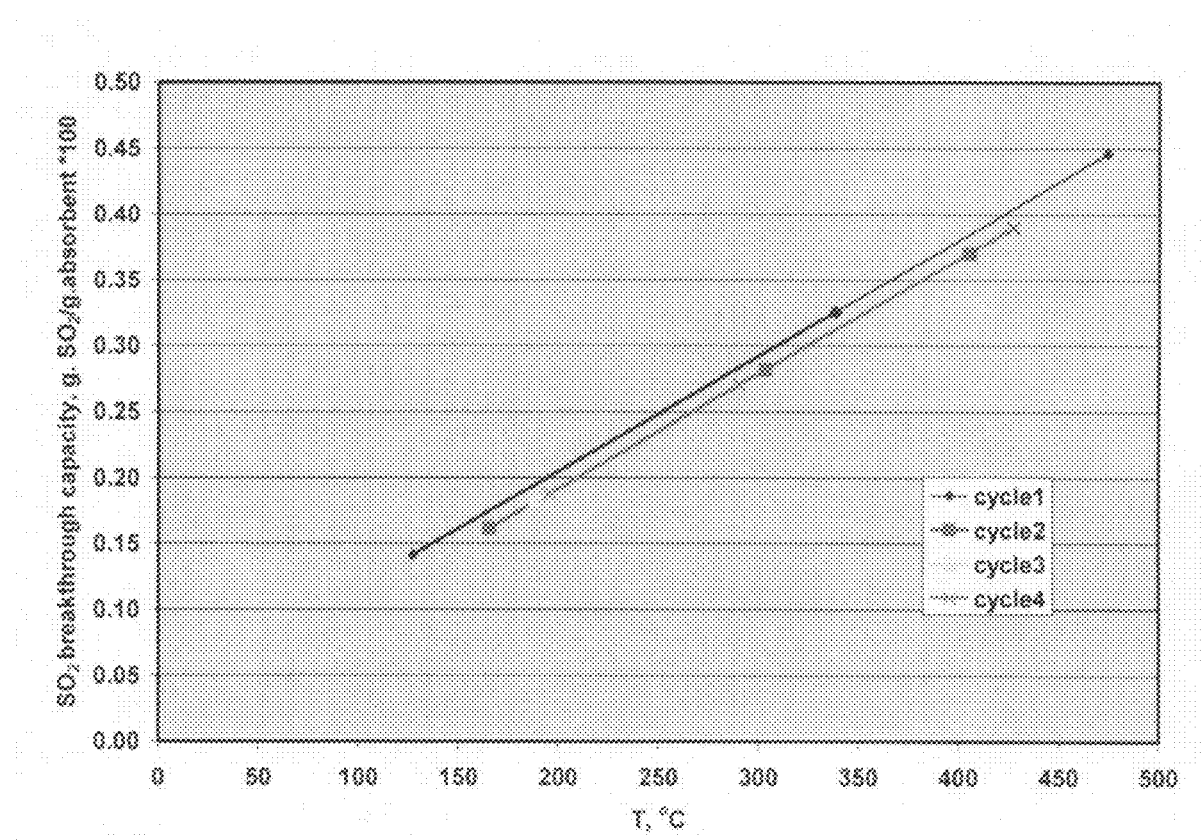
FIG. 3 is a graph illustrating the temperature effect of sulfur dioxide breakthrough capacities on a disclosed absorbent sample during different sulfation cycles.
Figure 4:
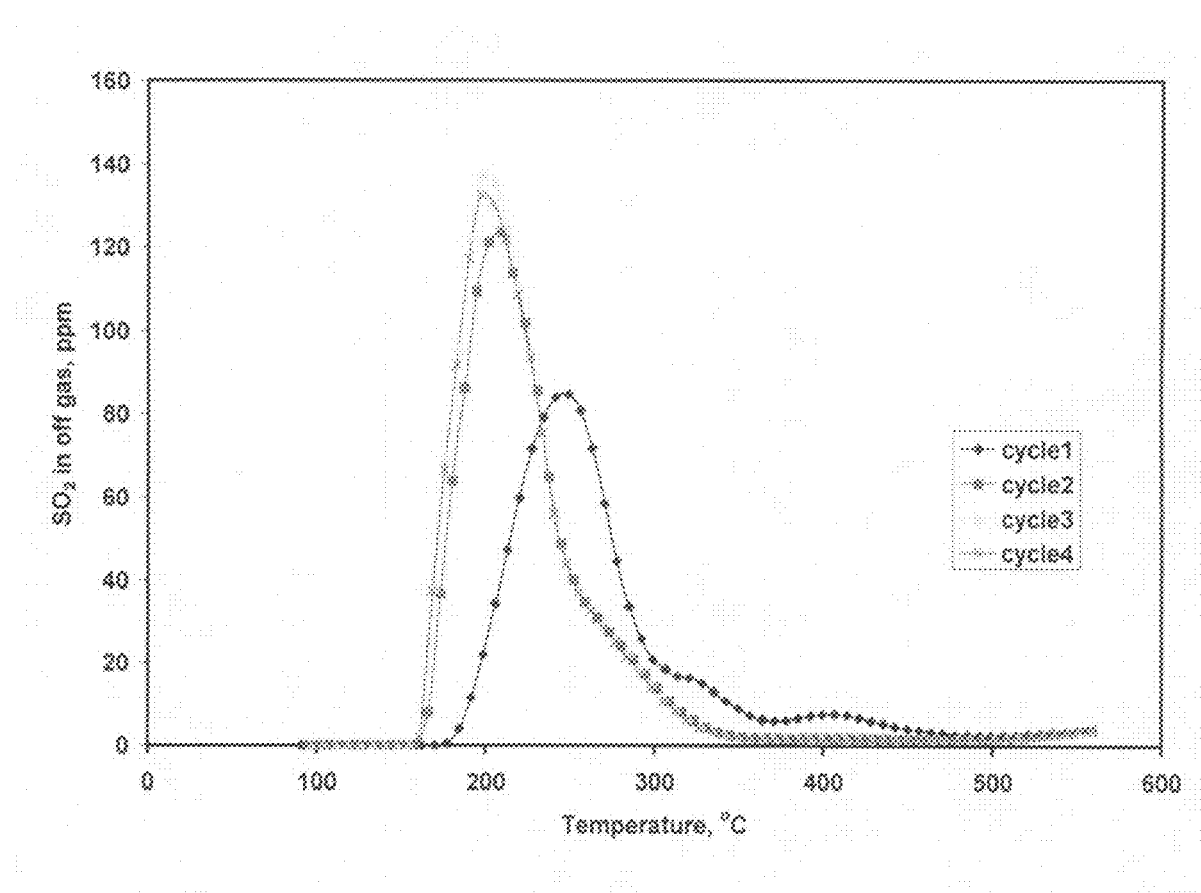
FIG. 4 is a graph illustrating the temperature effect of sulfur dioxide desorption on a sulfated absorbent sample during different desulfation cycles.

This example describes determining the $SO_2$ absorption capacity of sample 86D (1 wt % Pt-5 wt % Ag—$SiO_2$) under lean conditions and this sample's $SO_2$ desorption performance under rich conditions. FIG. 1 illustrates the sulfation/desulfation evaluation results. The evaluation was carried out as follows: First, the absorbent was heated from room temperature to 560° C. at 10° C./min in lean feed gas at 100K $hr^{-1}$ GHSV, during which $SO_2$ absorption occurred (sulfation test). After cooling in air to 50° C., the sample was heated to 560° C. at 10° C./min in rich feed at 20K $hr^{-1}$ GHSV during which $SO_2$ desorbed (desulfation test). After cooling again to 50° C. in air, the sample was heated to 560° C. in lean feed for a second sulfation test, and then a second desulfation followed after first cooling down to 50° C. The results of four such sulfation/desulfation cycles are illustrated in FIG. 1. During the cycling, $SO_2$ concentration in the off-gas was measured using the GC-SCD system. From each sulfation test, $SO_2$ breakthrough (defined at 200 ppb $SO_2$) capacities at three different temperatures can be obtained as shown in FIG. 2. With continued reference to FIG. 2, the initial low temperature capacity at T1 can be calculated (~200° C.) based on feed $SO_2$ concentration and time. Above T1 the $SO_2$ concentration in the exit stream exceeds 200 ppb. However, as the temperature continues to ramp upward, the $SO_2$ concentration first increases and then decreases until $SO_2$ in the effluent is again at 200 ppb (at T2). The capacity at T2 can again be calculated based on time on stream and $SO_2$ absorbed on the absorbent. Eventually at T3 the $SO_2$ in the effluent once again reaches 200 ppb and the capacity at that temperature can again be calculated. From each desulfation test, a temperature-programmed reduction curve can be obtained. FIGS. 3 and 4 summarize the $SO_2$ absorption and desorption information from the four sulfation-desulfation cycles. The $SO_2$ absorption (sulfation) capacity as a function of temperature, illustrated in FIG. 3, exhibits linear behavior, allowing estimation of total capacity at any operating temperature over a broad temperature range from about 200° C. to 450° C. After the first one or two cycles, this absorbent shows good and reproducible low temperature $SO_2$ absorption and desorption behavior. The results illustrated in FIG. 4 indicate that once steady state operation of the absorbent is achieved (starting at the second cycle), full desulfation can be achieved at approximately 300° C. and higher. Based on the sulfur balance, more than 90% of sulfur that is absorbed during the sulfation step is removed during the subsequent desulfation step. This demonstrates a constant sulfation performance of the absorbent after the first cycle.

Example 2

Figure 5:
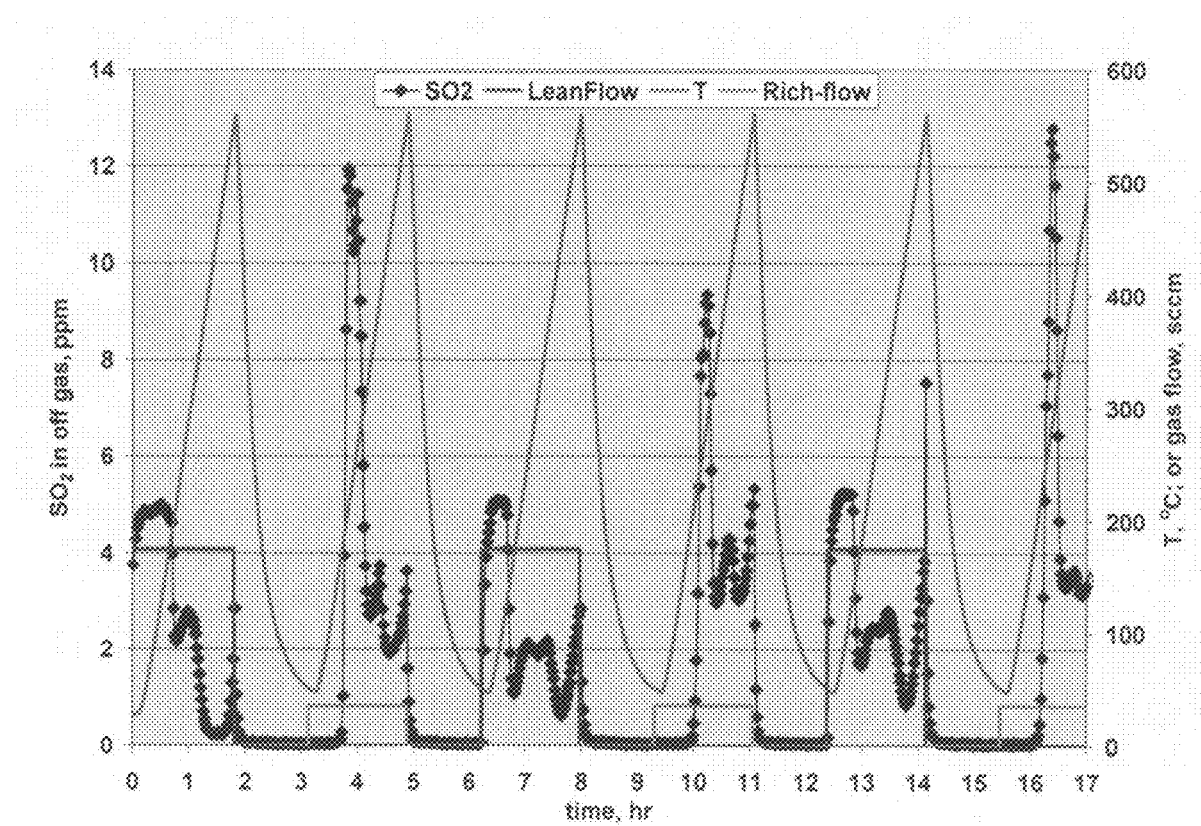
FIG. 5 illustrates the sulfation/desulfation performance of sample 83A (1 wt % Pt-10 wt % Cu—$SiO_2$) under the lean rich cycling conditions employed in FIG. 1.
Figure 6:
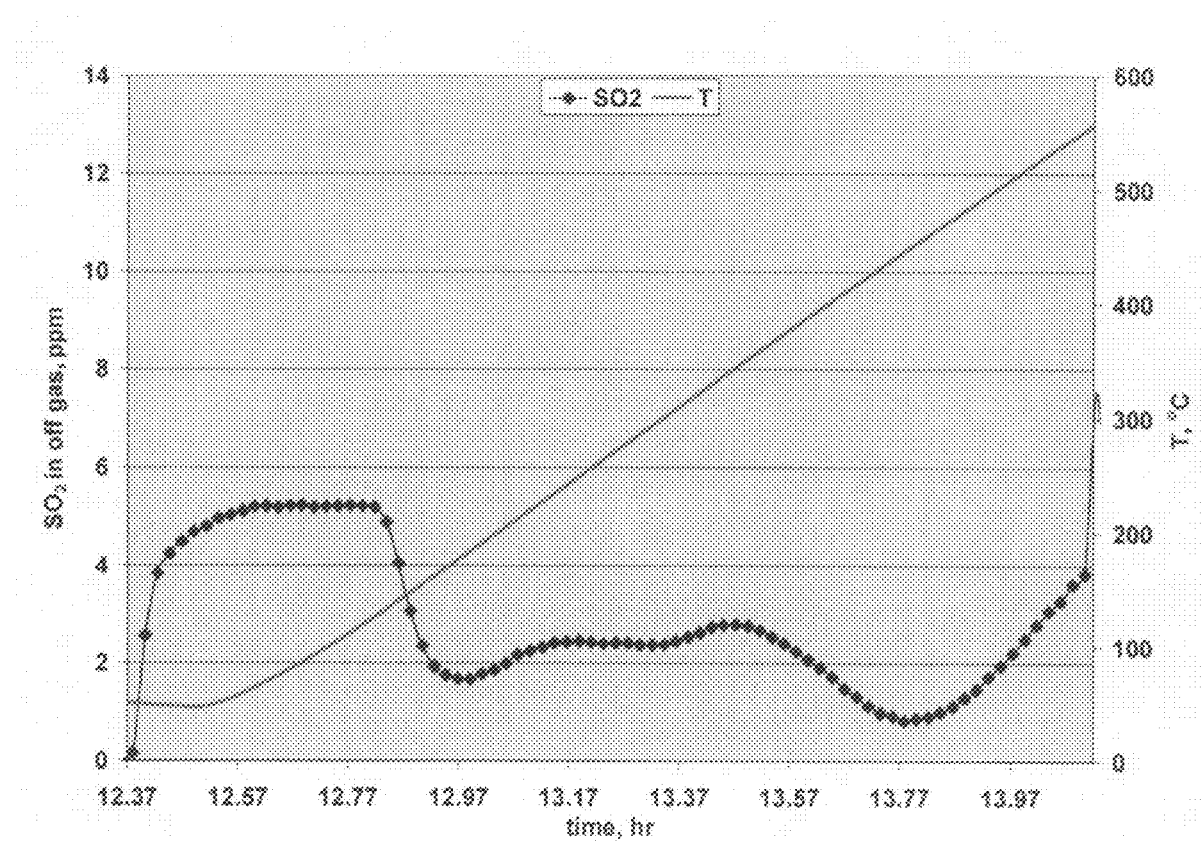
FIG. 6 illustrates the sulfur dioxide absorption of sample 83A in a typical sulfation step in a sulfation/desulfation evaluation.

This example illustrates the superior performance of the presently disclosed sorbent materials as compared to a copper-based adsorbent system. FIG. 5 records the results of a sulfation/desulfation cycling evaluation of the copper-based adsorbent sample 83A (1 wt % Pt-10 wt % Cu—$SiO_2$). With continued reference to FIG. 5, the copper-based system requires higher temperatures to remove $SO_2$, and full release of $SO_2$ is not achieved over the duration of the rich cycle. In addition, the $SO_2$ in the effluent rapidly approaches 5 ppm at the beginning of the lean cycle and over most of the temperature range exceeds 2 ppm (FIG. 6). These results demonstrate that the presently disclosed silver-based system is significantly more efficient than copper-based systems. Without being limited to theory, it is believed that the present sorbent materials are more efficient due to the fact that during a rich cycle, copper oxide is being reduced in parallel with the reduction of copper sulfate, which also leads to copper metal. During the lean phase, the copper present must first be oxidized to copper oxide before it can absorb $SO_2$ (as $SO_3$), so that until this occurs the copper-based absorbent loses effectiveness. In contrast, $Ag_2O$ is thermally unstable under lean conditions decomposing to metallic Ag and $O_2$ at elevated temperature, such as above 230° C. This means $Ag_2O$ reduction does not compete with the rich cycle regeneration of $Ag_2SO_4$ like CuO reduction competes with copper sulfate reduction. Therefore fast regeneration is possible even at high silver loadings.

Figure 7:
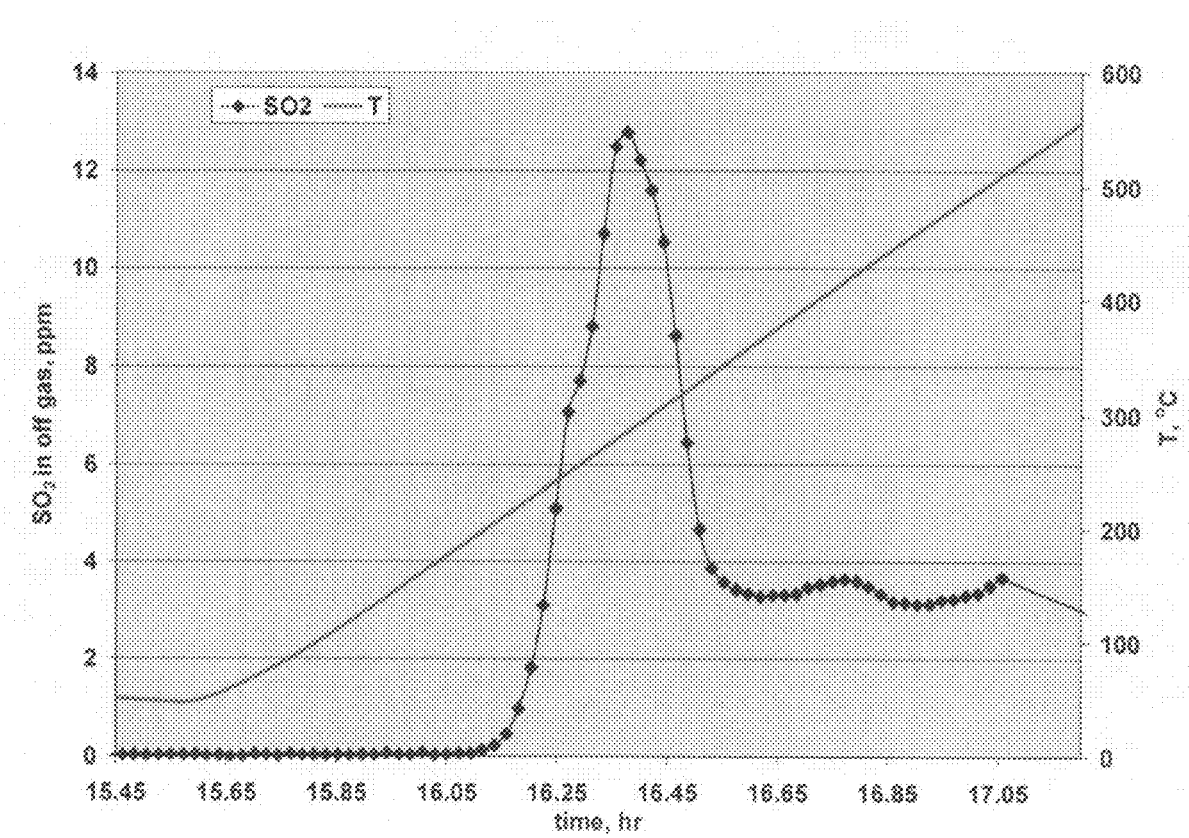
FIG. 7 illustrates the sulfur dioxide desorption of sample 83A in a regeneration step/desulfation step of sulfation/desulfation evaluation.

Further comparison of the present sorbents with copper-based systems, with reference to FIG. 6, demonstrates that $SO_2$ removal in the copper-based system is not as efficient as that of the presently disclosed sorbents. Moreover, with reference to FIG. 7, higher temperature is needed to remove the absorbed $SO_2$ from sample 83A than from the presently disclosed sorbent materials. Additionally, the desulfation of the copper-based absorbents is not complete.

Example 3

Figure 8:
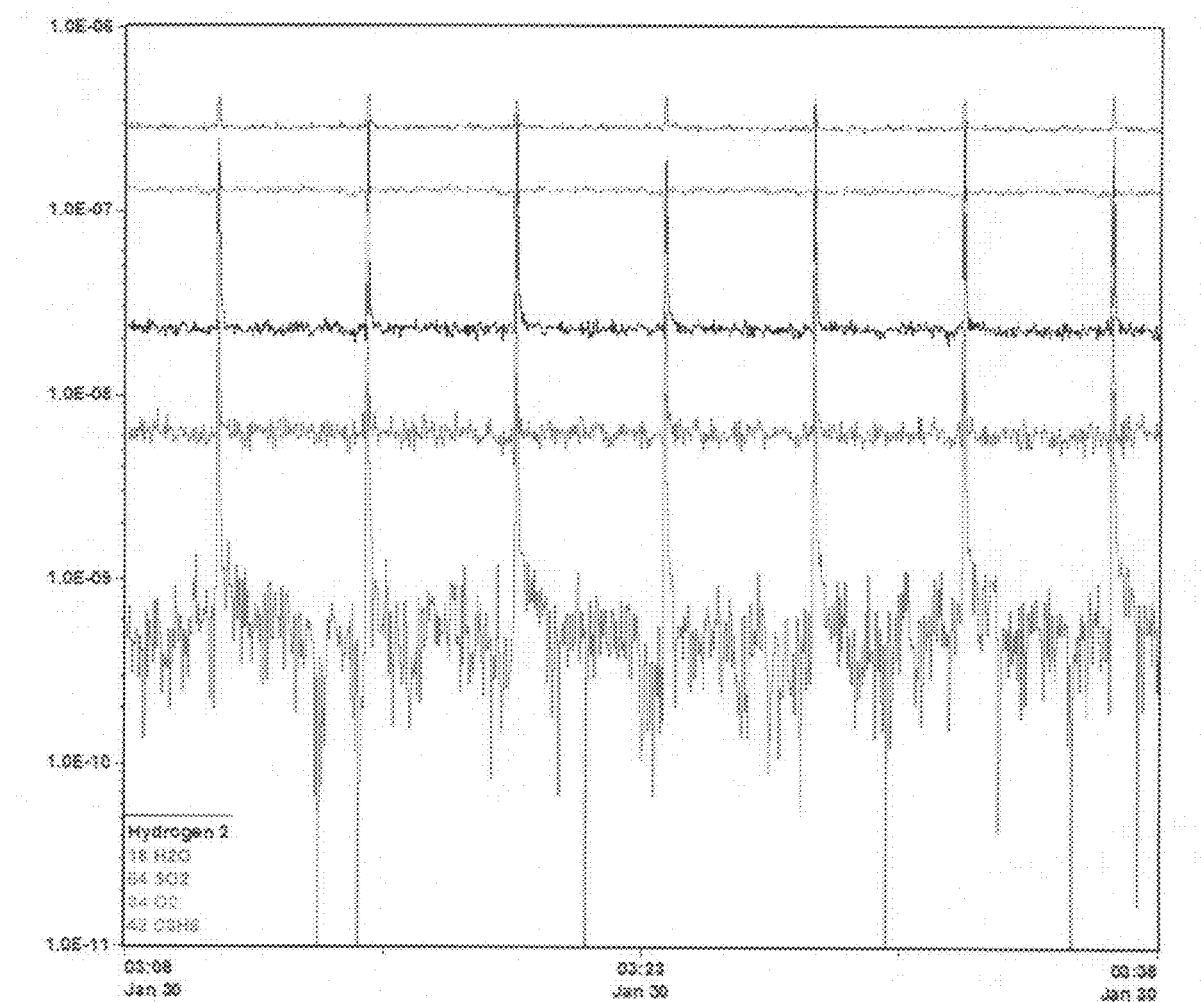
FIG. 8 is a mass spectrometric analysis of the off-gas composition during a lean-rich cycling test on a presently disclosed absorbent.

This example describes the evaluation of Pt—Ag—$SiO_2$ sorbent systems under lean/rich cycles at different temperatures and with and without steam being present in the feed. The results of this evaluation are recorded in Table 3 and FIG. 8. Specifically, FIG. 8 indicates the off-gas composition of sample 86D as the sample was subjected to cycling with 20 sec rich feed at 10K $hr^{-1}$ Gas Hourly Space Velocity (GHSV) and 4 min lean feed at 50K $hr^{-1}$ GHSV at 300° C. The cycling was repeated for a total duration of 18.5 hours (258 lean/rich cycles). For the entire duration the absorbent showed very stable performance. During the lean cycles, more than 97% of the $SO_2$ present in the exhaust stream is absorbed as measured by GC, and during the short rich cycle period a large amount of $SO_2$ is released. No noticeable carbonyl sulfide (COS) or other sulfur species is released during the rich cycles based on mass spectrometric measurement. Based on the combined information from the GC and MS, the maximum $SO_2$ concentration eluted during the rich cycles is more than 100 ppm, and virtually all the sulfur is desorbed as $SO_2$. This example demonstrates that the absorbent can last more than 18.5 hours (258 lean-rich cycles) without showing any performance change as stable levels of $SO_2$ removal were observed during the lean cycles. This indicates that the absorbent is substantially completely regenerated during the rich cycles. Without regeneration, the same amount of material can only last about 1 hour under tested condition before 200 ppb $SO_2$ breakthrough occurs.

TABLE 3

1 wt % Pt—5 wt % Ag—SiO$_2$ (sample#86D) as a fast regenerable SO$_2$ sorbent

| Particle size, mesh | Temperature °C. | Lean cycle Time-GHSV | Rich cycle Time-GHSV | Total Duration, hr | SO$_2$ removal during lean cycles, % |
|---|---|---|---|---|---|
| 40-80 | 200 | 12 min 100 K | 2 min 20 K | 1.5 | 55 |
| 40-80 | 250 | 12 min 100 K | 2 min 20 K | 7.5 | 90 to 80* |
| 40-80 | 300 | 12 min 100 K | 2 min 20 K | 20 | 98 |
| 40-80 | 350 | 12 min 100 K | 2 min 20 K | 20 | 99 |
| 40-80 | 450 | 12 min 100 K | 2 min 20 K | 24 | 99 |
| 40-80 | 550 | 12 min 100 K | 2 min 20 K | 24 | 98 |
| 80-200 | 250 | 12 min 50 K | 2 min 10 K | 3.5 | 98 |
| 80-200 | 450 | 12 min 50 K | 2 min 10 K | 7 | 98 |
| 80-200 | 550 | 12 min 50 K | 2 min 10 K | 9 | 98 |
| 80-200 | 250 | 8 min 50 K | 1 min 10 K | 9.5 | 97 |
| 80-200 | 550 | 8 min 50 K | 1 min 10 K | 9.5 | 98 |
| 80-200 | 250 | 4 min 50 K | 20 sec 10 K | 23 | 98 to 91* |
| 80-200 | 300 | 4 min 50 K | 20 sec 10 K | 18.5 | 97 |
| 80-200 | 500 | 4 min 50 K | 20 sec 10 K | 21.5 | 98 |
| 80-200 | 550 | 4 min 50 K | 20 sec 10 K | 6 | 98 |
| 80-200 | 200 | 4 min 100 K | 20 sec 10 K | 2 | 99 to 61* |
| 80-200 | 250 | 4 min 100 K | 20 sec 10 K | 2 | 98 to 90* |
| 80-200 | 300 | 4 min 100 K | 20 sec 10 K | 6 | 97 |
| 80-200 | 350 | 4 min 100 K | 20 sec 10 K | 2 | 98 |
| 80-200 | 400 | 4 min 100 K | 20 sec 10 K | 2 | 99 |
| 80-200 | 450 | 4 min 100 K | 20 sec 10 K | 2 | 99 |
| 80-200 | 500 | 4 min 100 K | 20 sec 10 K | 2 | 99 |
| 80-200 | 550 | 4 min 100 K | 20 sec 10 K | 2 | 99 |

*Unstable SO$_2$ removal performance was measured during the test duration.

With reference to Tables 4 and 5, water interferes with both the sorption and desorption of sulfur dioxide. Without being limited to theory, it currently is believed that water hampers the performance of disclosed sorbent materials because water is produced during the lean cycle desorption of sulfur dioxide according to the equation $$Ag_2SO_4 + 2H_2 = Ag + SO_2 + 2H_2O$$

The effect of steam on the performance of two different sorbent materials was evaluated at various temperatures using 50 mg each of 80-200 mesh particles of sorbent 86D (Table 4) and 118 (Table 5), lean-rich cycling (4 min 100K GHSV lean, 20 sec 10K GHSV rich, test duration: 2 hr for each temperature). Lean steam-containing streams employed in these tests had the composition: 1.2% H$_2$O, 5% CO$_2$, 5.1 ppm SO$_2$, 12% O$_2$, 20 ppm NO$_2$, 178 ppm NO, with the balance being N$_2$. Rich steam-containing streams had the composition: 12% H$_2$O, 1.76% CO, 11% CO$_2$, 293 ppm C$_3$H$_6$, 1.76% H$_2$, balance in N$_2$.

TABLE 4

Steam Effect on 1Pt—5Ag—SiO$_2$ (Pt from H$_2$PtCl$_6$·6H$_2$O, #86D)

| Temperature, °C. | SO$_2$ removal during lean cycles 12% steam in rich feed 1.2% steam in lean feed % | SO$_2$ removal during lean cycles (No steam in feed) % |
|---|---|---|
| 200 | 37 | 61 |
| 250 | 51-31 | 90 |
| 300 | 78 | 97 |
| 350 | 94 | 98 |
| 400 | 94 | 99 |
| 450 | 94 | 99 |
| 500 | 94 | 99 |
| 550 | 94 | 99 |

TABLE 5

Performance of 1Pt—5Ag—SiO$_2$ absorbent (Pt source Pt(NH$_3$)$_4$(NO$_3$)$_2$)

| Temperature, °C. | SO$_2$ removal during lean cycles 12% steam in rich feed 1.2% steam in lean feed % | SO$_2$ removal during lean cycles (No steam in feed) % |
|---|---|---|
| 200 | 2 | 26 |
| 250 | 2 | 86 |
| 300 | 94 | 98 |
| 350 | 97 | 99 |
| 400 | 97 | 99 |
| 450 | 98 | 99 |
| 500 | 98 | 99 |
| 550 | 98 | 99 |

The results recorded in Tables 4 and 5 demonstrate that the presently disclosed sorbent materials effectively adsorb and desorb sulfur dioxide when the waste stream includes steam, particularly at higher temperatures. With continued reference to Tables 4 and 5, sorbent 118, which employs Pt(NH$_3$)$_4$(NO$_3$)$_2$ (rather than H$_2$PtCl$_6$·6H$_2$O) as the platinum precursor, is a more effective sorbent for steam-containing feeds.

Example 4

Figure 9:
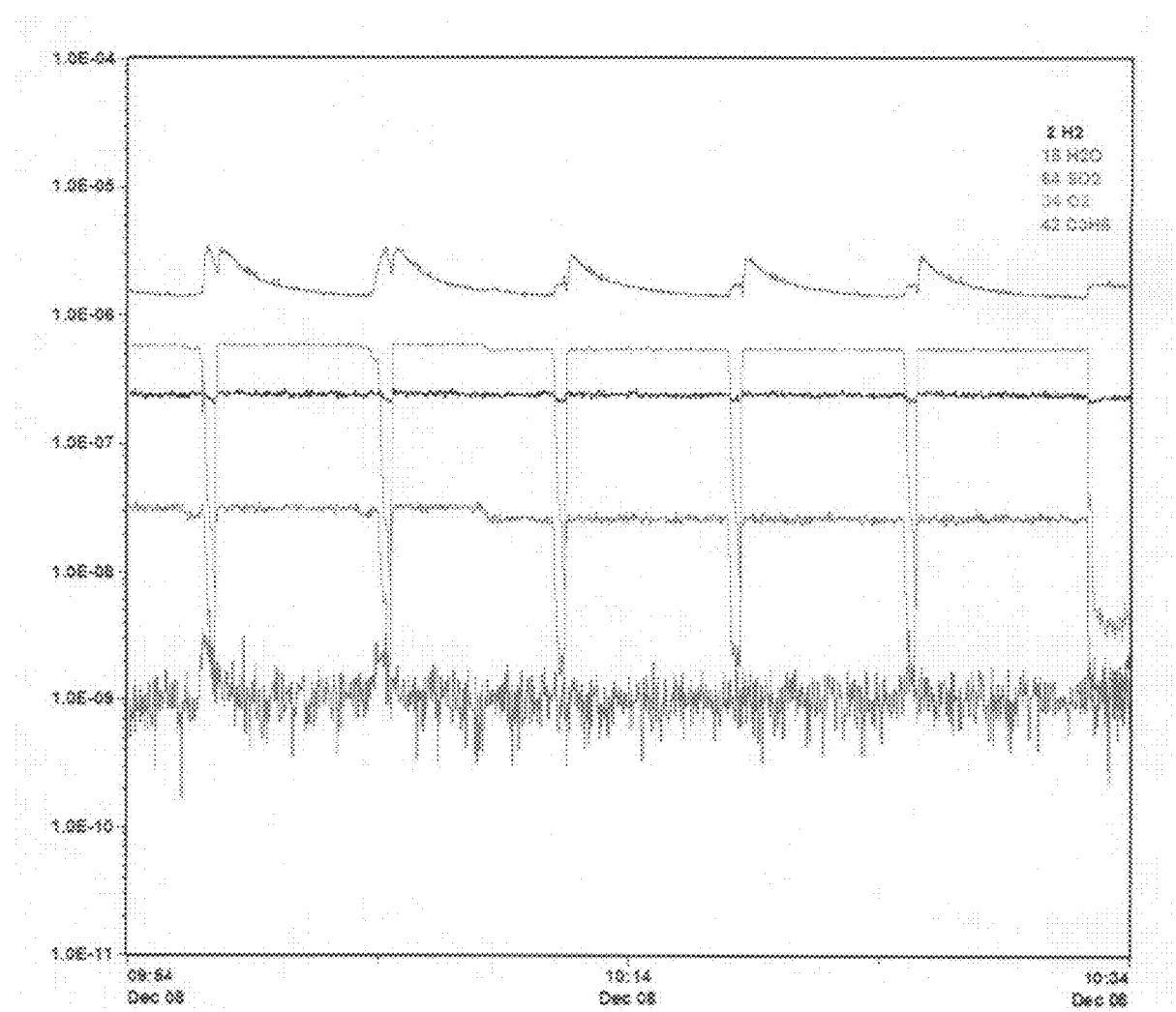
FIG. 9 is a gas chromatography analysis of the off-gas composition during a lean-rich cycling test on sample 83D, 1 wt % Pt-10 wt % Cu—$Al_2O_3$.

This example describes the evaluation of a copper-based absorbent, sample 83D, 1 wt % Pt-10 wt % Cu—Al$_2$O$_3$ under lean/rich cycling conditions. The off gas composition during the test is recorded in FIG. 9. The evaluation was carried out at 350° C., with cycling with 1 min rich feed at 20K hr$^{-1}$ GHSV and 6 min lean feed at 100K hr$^{-1}$ GHSV. Unlike that the presently disclosed sorbent systems, the copper-based system releases only a very small amount of SO$_2$ under rich conditions. Moreover, the H$_2$ concentration emitted during the short rich cycles does not increase, indicating its consumption by CuO in the absorbent. This mechanism is supported by the presence of H$_2$O in the off gas and is consistent with the conclusion that CuO reduction is occurring in parallel with copper sulfate reduction. Under the tested rich conditions (20K hr$^{-1}$ GHSV and 2% H$_2$ and 2% CO) it takes about 3 minutes for the copper-based sorbent to be regenerated as evidenced by an increase of the concentrations of $H_2$ and $SO_2$ in the off gas. This result clearly demonstrates one advantage of embodiments of the presently disclosed sorbent systems as fast regenerable $SO_2$ absorbers.

Example 5

This example describes the evaluation of Pt—Ag—$SiO_2$ sorbent systems having different platinum concentrations. With reference to FIGS. 10 and 11, sulfation-desulfation tests were carried out using absorbents with different Pt loadings: 1 wt % Pt (sample 118), 0.1 wt % Pt (sample 120B), and 0 wt % Pt (sample 146). FIGS. 10 and 11 illustrate the steady state results that were obtained from the third sulfation/desulfation cycle. Although significant differences in the performances of samples 118 and 120B under lean/rich cycling conditions (see Table 6) were observed, these three samples only showed small differences in their performance under the sulfation/desulfation test. Pt in the absorbent contributes mostly to absorbents' full regeneration at low temperatures, which is important for their performance Linder lean-rich cycling conditions, especially when the engine is idling for extended periods of time. Without being limited to theory, it appears that the role of Pt is not to oxidize $SO_2$ to $SO_3$, facilitating formation of $Ag_2SO_4$, and this role appears to be adequately handled by the Ag component.

With reference to Table 6, each absorbent was prepared with 80-200 mesh particle size and subjected to cycling with 20 sec rich feed at 20K $hr^{-1}$ GHSV and 4 min lean feed with 25 ppm $SO_2$ at 50K $hr^{-1}$ GHSV, 2 hr test duration at each temperature. The absorbent samples were prepared according to the procedures set forth in Table 1.

TABLE 6

Screening test results of different Pt—Ag—$SiO_2$ absorbent

| | | $SO_2$ removal during lean cycles, % | | | | |
|---|---|---|---|---|---|---|
| Sample I.D. | Absorbent composition | 550° C. | 450° C. | 350° C. | 300° C. | 250° C. |
| 86D | 1 wt % Pt—5 wt % Ag—$SiO_2$ | 99 | 99 | 96 | 80 | 20 |
| 125A | 1 wt % Pt—10 wt % Ag—$SiO_2$ | 98 | 99 | 94 | 88 | 0 |
| 125B | 2 wt % Pt—10 wt % Ag—$SiO_2$ | 98 | 99 | 88 | 32 | 4 |
| 120B | 0.1 wt % Pt—5 wt % Ag—$SiO_2$ | 90 | 98 | 92 | 84 | 0 |
| 120A | 0.5 wt % Pt—5 wt % Ag—$SiO_2$ | 99 | 98 | 97 | 64 | 4 |
| 118 | 1 wt % Pt—5 wt % Ag—$SiO_2$ | 98 | 99 | 98 | 88 | 12 |
| 128 | 2 wt % Pt—5 wt % Ag—$SiO_2$ | 98 | 99 | 96 | 80 | 12 |
| 130A | 1 wt % Pt—2.5 wt % Ag—$SiO_2$ | 98 | 98 | 96 | 72 | 0 |
| 130B | 1 wt % Pt—7.5 wt % Ag—$SiO_2$ | 99 | 99 | 94 | 72 | 0 |
| 120C | 1 wt % Pt—3.2 wt % Ag—$SiO_2$ | 96 | 99 | 88 | 36 | 8 |

Example 6

Figure 12:
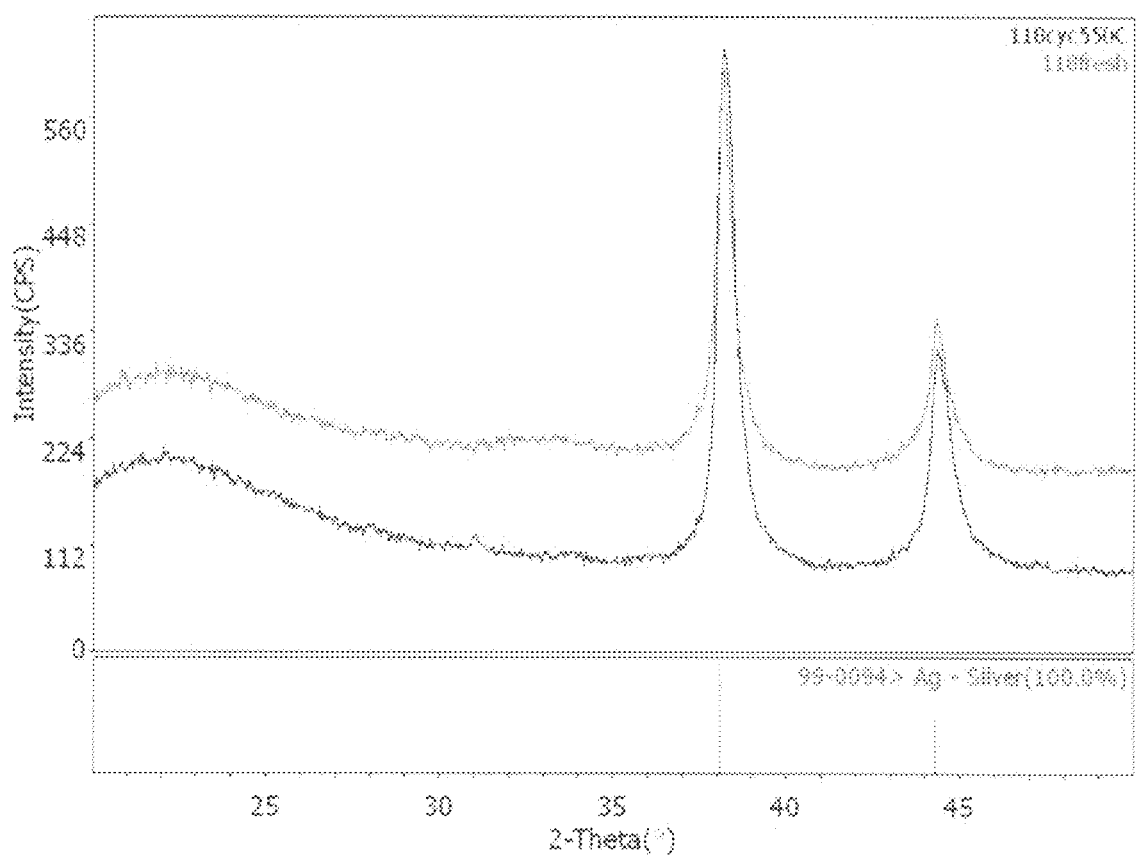
FIG. 12 includes XRD patterns of fresh (bottom), and 550° C. lean-rich cycled (top) absorbent sample.
Figure 13:
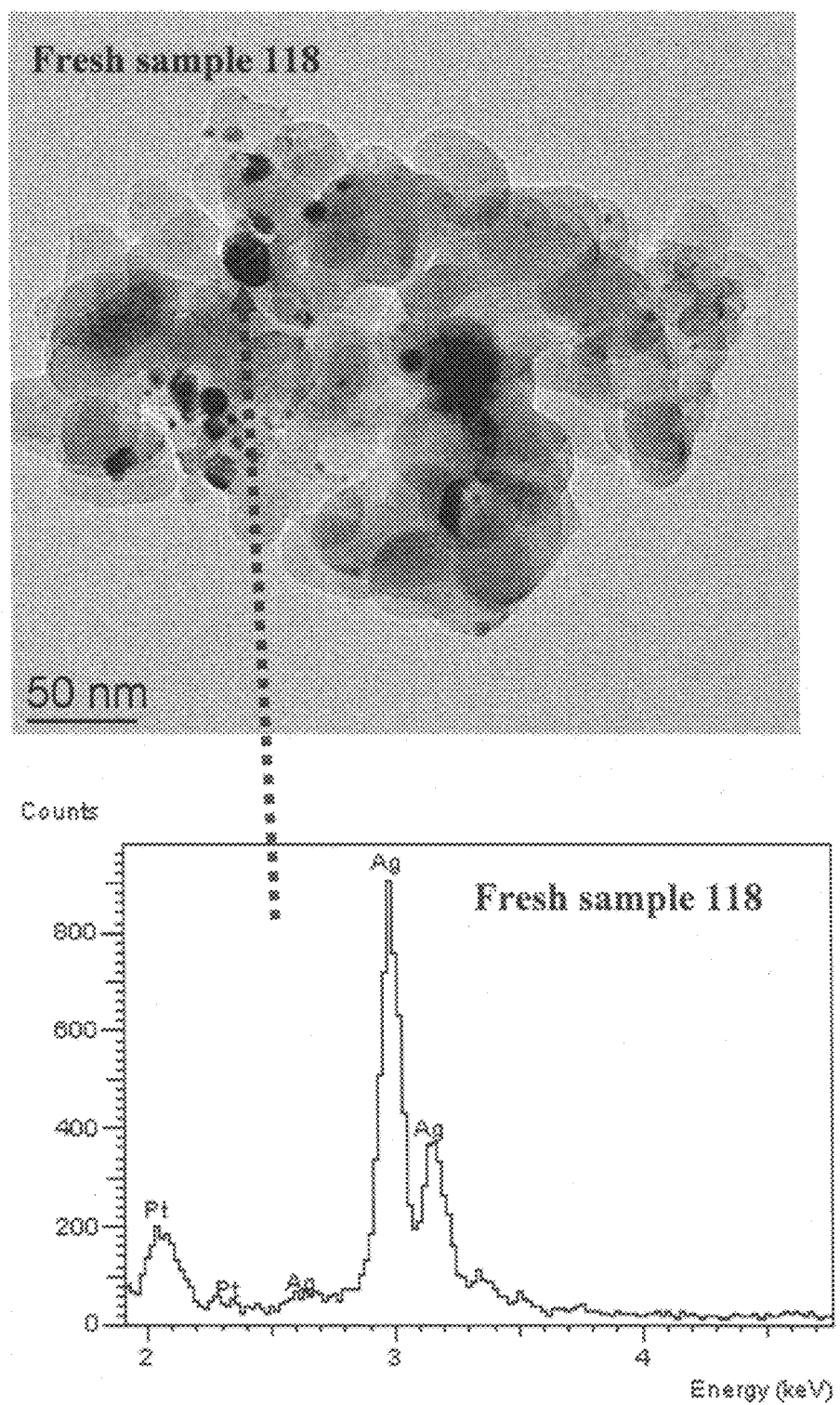
FIG. 13 is a TEM image and an EDS spectrum of the indicated portion of fresh sample 118.
Figure 14:
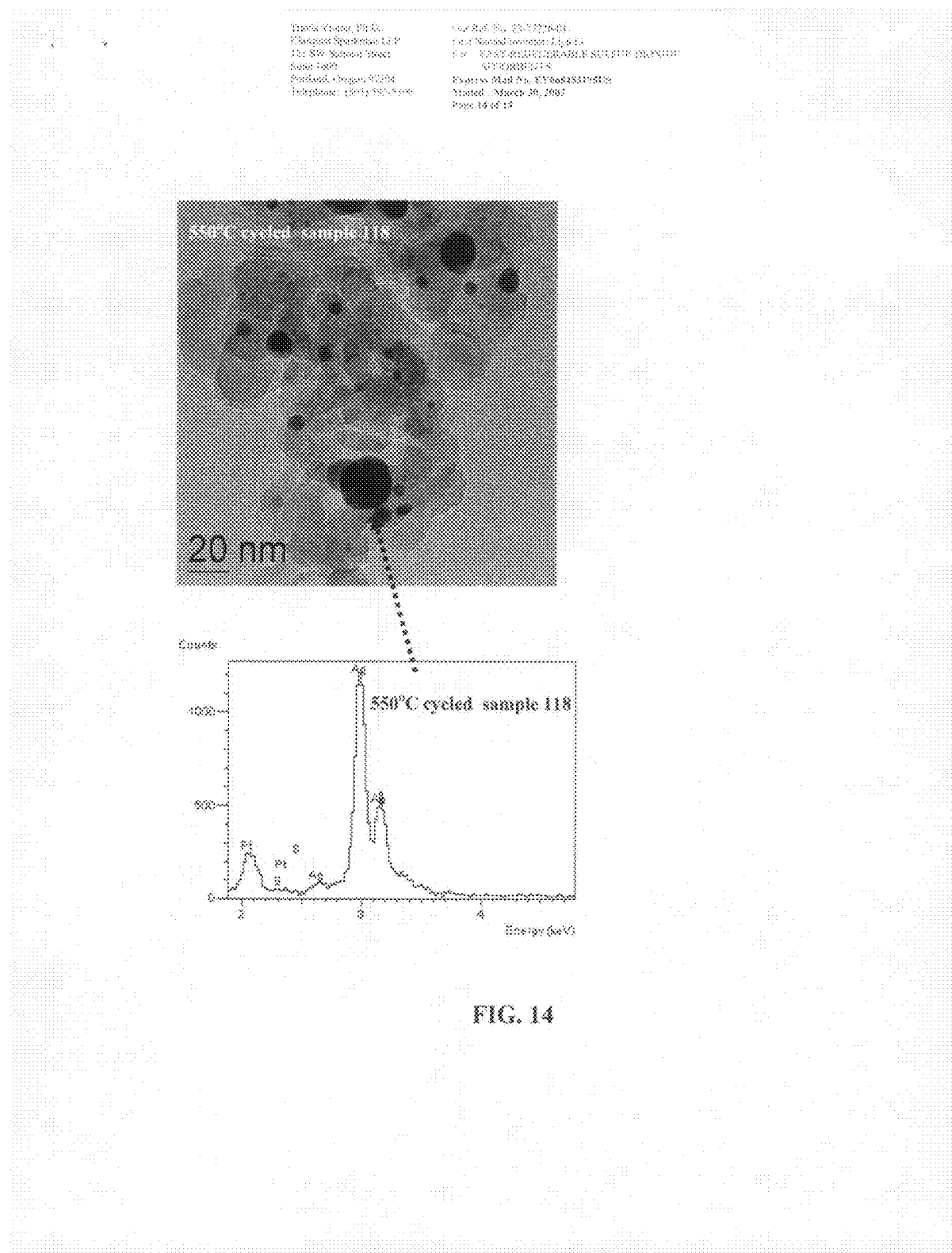
FIG. 14 is a TEM image and an EDS spectrum of the indicated portion of sample 118 after 550° C. lean-rich cycling.

This example describes the characterization of sorbent materials before and after cycling using microscopy and spectroscopy. Fresh, and 550° C. lean/rich cycled absorbents (sample 118) were analyzed using XRD, and TEM-EDS. With reference to FIG. 12, XRD patterns of fresh (bottom), and 550° C. lean-rich cycled (top) absorbent sample indicate that there is a modest increase in particle size, based on line broadening. FIGS. 13 and 14 show their XRD patterns and TEM images along with the EDS spectra. EDS spectra indicate that well-mixed Ag—Pt alloy was formed on the fumed silica support with the synthesis method used in this work. A slight metal sintering effect was observed after lean-rich cycling as the Ag/Pt alloy particles become more spherical. A modest particle size increase was observed based on XRD line broadening and TEM analysis. Also, EDS spectra show no detectable sulfur in the lean-rich cycled samples, indicating most sulfur is desorbed during the short rich cycles.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system for controlling the emissions of a combustion exhaust stream source, comprising:
    first and second emission control devices, the first emission control device being upstream of the second emission control device;
    wherein the first emission control device comprises a sorbent material comprising first and second catalytic materials and a carrier, wherein the first catalytic material comprises from about 0.1 weight percent to about 10 weight percent of a precious metal and the second catalytic material comprises from about 1 to about 50 weight percent silver;
    wherein the first emission control device comprises a sulfur dioxide trap that is that is regenerable using a rich gas stream; and
    wherein the sulfur dioxide trap is substantially completely regenerable in one minute or less.

2. The system of claim 1, wherein the precious metal in the first catalytic material is selected from the group consisting of platinum, palladium, ruthenium, rhodium and combinations thereof.

3. The system of claim 1, wherein the first catalytic material comprises platinum.

4. The system of claim 1, wherein the rich gas stream is a combustion exhaust stream.

5. The system of claim 1, wherein the rich gas stream comprises reformate.

6. The system of claim 1, wherein the second emission control device comprises a $NO_x$ trap.

7. The system of claim 6, wherein all gas input to the NOx trap is gas output from the sulfur dioxide trap and the NOx trap is regenerable using the gas output from the sulfur dioxide trap during regeneration of the sulfur dioxide trap.

8. The system of claim 1, wherein the sulfur dioxide trap is regenerable using a combustion exhaust stream having a temperature of from about 200° C. to about 550° C.

9. The system of claim 1, wherein the sulfur dioxide trap is regenerable using a combustion exhaust stream having a temperature of from about 300° C. to about 450° C.

10. The system of claim 1, wherein the first emission control device comprises sufficient sorbent material to remove at least about 90% of sulfur dioxide from a combustion exhaust stream source.

11. The system of claim 1, wherein the first emission control device comprises sufficient sorbent material to remove at least about 95% of sulfur dioxide from a combustion exhaust stream source.

12. The system of claim 1, wherein the first emission control device comprises sufficient sorbent material to remove at least about 97% of sulfur dioxide from a combustion exhaust stream source.

13. The system of claim 1, wherein the combustion exhaust stream is a vehicular combustion exhaust stream source.

14. The system of claim 1, wherein the combustion exhaust stream source is a diesel engine.

15. The system of claim 14, further comprising a diesel particulate filter fluidly connectable to the combustion exhaust stream source.

16. The system of claim 15, wherein the diesel particulate filter is positioned fluidly downstream of the first emission control device and upstream of the second emission control device.

17. The system of claim 1, further comprising a reformer fluidly connectable to the first emission control device.

18. The system of claim 1, wherein the carrier of the first emission control device is a porous carrier comprising a precious metal; wherein the first catalytic material is selected from the group consisting of platinum, palladium, ruthenium, rhodium and combinations thereof, relative to the porous carrier; and wherein the second catalytic material is impregnated in the porous carrier.

19. The system of claim 1, wherein the sulfur dioxide trap is substantially completely regenerable in about twenty seconds.

20. The system of claim 1, wherein sulfur is removed from the sulfur dioxide trap when the sulfur dioxide trap is regenerated and substantially all of said sulfur is in the form of sulfur dioxide.

21. The system of claim 1, wherein the sulfur dioxide trap is capable of repeatedly:
sorbing about 97% or more of sulfur dioxide present in a combustion exhaust gas stream during lean cycles and substantially completely regenerating during rich cycles,
wherein the ratio of the durations of lean cycles to rich cycles is greater than or equal to 12:1.

22. The system of claim 1, wherein the sulfur dioxide trap is configured to sorb about 97% or more of sulfur dioxide present in a combustion exhaust gas stream during lean cycles having a period of at least about 4 minutes.

23. The system of claim 1, wherein the sulfur dioxide trap is substantially completely regenerable in twenty seconds or less during rich cycles of the combustion exhaust gas stream such that sulfur dioxide eluted from the sulfur dioxide trap during regeneration has a concentration greater than about 100 parts per million.

* * * * *